US010525674B2

(12) United States Patent
Linthout et al.

(10) Patent No.: US 10,525,674 B2
(45) Date of Patent: Jan. 7, 2020

(54) GLAZED VEHICLE ROOF

(71) Applicant: AGC GLASS EUROPE, Louvain-la-Neuve (BE)

(72) Inventors: Sebastien Linthout, Archennes (BE); Rostislav Losot, Louvain-la-Neuve (BE); Jonathan Vivier, Beuzet (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 187 days.

(21) Appl. No.: 15/104,180

(22) PCT Filed: Dec. 10, 2014

(86) PCT No.: PCT/EP2014/077234
§ 371 (c)(1),
(2) Date: Jun. 13, 2016

(87) PCT Pub. No.: WO2015/086683
PCT Pub. Date: Jun. 18, 2015

(65) Prior Publication Data
US 2016/0325529 A1    Nov. 10, 2016

(30) Foreign Application Priority Data

Dec. 13, 2013   (BE) .................................. 2013/0837

(51) Int. Cl.
*B32B 17/10*    (2006.01)
*G02F 1/137*    (2006.01)
*B60Q 3/208*    (2017.01)

(52) U.S. Cl.
CPC .. *B32B 17/10541* (2013.01); *B32B 17/10036* (2013.01); *B32B 17/10504* (2013.01);
(Continued)

(58) Field of Classification Search
CPC ............... G02F 1/137; B32B 17/10541; B32B 17/10036
See application file for complete search history.

(56) References Cited

U.S. PATENT DOCUMENTS 6,309,901 B1 *   10/2001   Tahon ............... B32B 17/10018
                                                        438/29
2002/0060310 A1 *   5/2002   Hasebe ............. C09K 19/2014
                                                        252/299.64

(Continued)

FOREIGN PATENT DOCUMENTS

JP   2003-157026 A    5/2003
JP   2006-323323 A    11/2006
(Continued)

OTHER PUBLICATIONS

International Search Report dated May 19, 2015 for PCT/EP2014/077234 filed on Dec. 10, 2014.

*Primary Examiner* — Lucy P Chien
(74) *Attorney, Agent, or Firm* — Oblon, McClelland, Maier & Neustadt, L.L.P.

(57) ABSTRACT

A laminated glazed automobile roof including two outer and inner sheets of glass and inserted sheets joining the sheets of glass, and including, arranged between the two sheets of glass, an LC (liquid crystal film) assembly for controlling light transmission, and light-emitting diode (LED) lighting elements.

22 Claims, 5 Drawing Sheets

(52) U.S. Cl.
CPC .............. *B60Q 3/208* (2017.02); *G02F 1/137* (2013.01); *B32B 2605/00* (2013.01); *G02F 2001/13756* (2013.01); *G02F 2203/055* (2013.01)

(56) References Cited

U.S. PATENT DOCUMENTS

| | | | |
|---|---|---|---|
| 2005/0163958 A1* | 7/2005 | Nakatsugawa | G02B 5/208 428/40.1 |
| 2006/0092348 A1 | 5/2006 | Park | |
| 2009/0046355 A1* | 2/2009 | Derda | B32B 17/10 359/359 |
| 2009/0091943 A1* | 4/2009 | Hotary | B60Q 3/68 362/488 |
| 2010/0060821 A1 | 3/2010 | Wang et al. | |
| 2013/0299856 A1* | 11/2013 | Verger | B32B 17/067 257/88 |

FOREIGN PATENT DOCUMENTS

| | | |
|---|---|---|
| WO | 2007/077239 A1 | 7/2007 |
| WO | 2009/087584 A1 | 7/2009 |

* cited by examiner

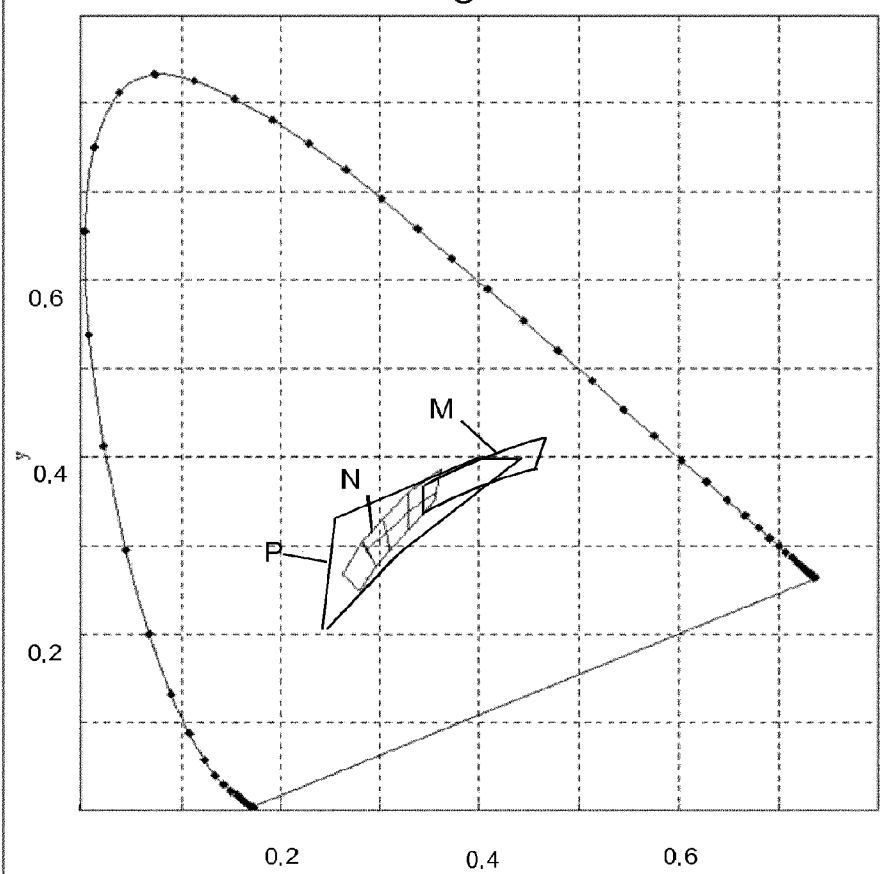

GLAZED VEHICLE ROOF

The invention relates to vehicle roofs formed, at least in part, from a glazing. More precisely, the invention relates to roofs the glazing of which covers a large portion of their area or even all of the latter.

Glazed roofs are increasingly being substituted for traditional roofs that are part of the body of vehicles. The choice of these roofs is a result of manufacturers offering to their customers this option, which makes the vehicle seem like it opens onto the exterior, like a convertible, without the drawbacks of convertibles, these roofs maintaining the comfort levels of traditional sedans. To do so glazed roofs must meet many requirements. It is recommended to address safety imperatives first. Glazed roofs must meet regulations that establish an ejection resistance in the case of an accident. Specifically, they must meet the rule known as rule "$R_{43}$". Passenger ejection resistance especially necessitates the use of laminated glazings.

The presence of laminated glazings does not obviate the need to limit weight. For this reason, the thickness of the laminated roofs used must also be kept down. In practice the glazings of these roofs have a thickness which is not greater than 15 mm and preferably not greater than 10 mm. In the weight of these glazings, the glass sheets represent an appreciable share having regard to the much greater density of the glass than that of the interlayer plastic sheets. Hence the total thickness of the glass sheets is preferably limited to 6 mm and advantageously to 5 mm.

The choice, as specified hereinabove, of glazed roofs is aimed initially at the gain in brightness within the cabin. Moreover the desire for a brightness increase in the cabin is not the only aim pursued, or it is not necessarily permanent. It may be at least partially substituted by that of conferring a temporary "privacy" aspect by switching from a "transparent" state to a "translucent" state. The user may, depending on the moment of use, prefer a lower brightness, or simply want to maintain an aspect of "privacy" that prevents the cabin from being looked into from the exterior.

Solutions have previously been proposed for modifying the luminous transmission of glazings as a function of the conditions of use. It may be a question in particular of what are referred to as "electrically controlled" glazings, such as glazings comprising electrochromic means in which the variation is obtained by modifying the state of colored ions in compositions contained in these glazings. It may also be a question of glazings comprising layers of particles in suspension, which, contingent on the application of an electrical voltage, are ordered or not, such as the systems called SPDs (for suspended particle devices).

A desire of manufacturers is to have products whose properties are akin to those mentioned hereinabove, but obtained with substantially less expensive products.

In their research, manufacturers may even envisage products whose performance may be different from that of the products indicated hereinabove, at least in respect of the performance that they estimate to be of lesser importance. Conversely certain functionalities remain decisive in respect of the implementation of these roofs with controlled properties. First, manufacturers desire systems whose reaction to command is practically instantaneous, in contradistinction to what is observed for electro-chromes. They also desire very precise optical properties. The glazing in the inactive state must completely mask vision so as to confer the "private" aspect sought. Conversely in the active state the quality of the glazing must lead to what is referred to as good "clarity". The latter must lead to affording, both for far and near vision, a very sharp image. This sharpness is contingent on the conditions of residual diffusion. The aim is to minimize this diffusion, or at least to attenuate the ensuing negative perception thereof.

The invention relates to electro-controlled roofs which make it possible to switch from a transparent state to a translucent state, in both states the transmittance remaining limited. The invention proposes the use of liquid-crystal (LC) films as means modifying the transmission properties.

The development of glazed roofs raises numerous questions and paves the way for new implementations. Certain functions may or must be modified on account of the specificities of these roofs.

Among these functions figures the lighting of the cabin, whether it is a question of ambient lighting or more localized lighting corresponding to that qualified a "reading light". Traditionally the means used for such lighting are disposed on the roof or on the interior cladding of the latter. Frequently also the lighting means form part of an assembly which extends in part over the windshield and which comprises the plinth of the interior rear view mirror, various sensors controlling the triggering of the windshield wipers, that of the exterior headlights, which assembly is also the carrier of means of data communication based on waves of varied frequencies (remote toll payments, GPS . . . ), or that for aiding driving such as infrared cameras. The assemblies in question locally constitute an obstacle to the desired transparency which motivates the choice of "glazed" solutions.

The invention proposes to optimize use of the glazings forming these roofs by integrating therein means for lighting the cabin of such design that they do not significantly impair their transparency. This integration, as described below, makes it possible to take advantage of new arrangements tailored to these glazed roofs.

The mode chosen according to the invention is the use of light-emitting diodes (LED) located in the laminated glazing. This choice has been proposed before, for example in patent applications WO 2004/062908, EP 1 437 215 and EP 1 979 160. According to these patent applications the diodes are included in the plastic interlayer which associates the two glass sheets. Depending on the application in question, the LEDs are either supplied with power by thin conductive wires (EP 1 979 160) or by transparent conducting layers (EP 1 437 215).

Apart from the principle of using LEDs for lighting, the prior art leaves unanswered questions relating to the conditions that will allow these products to meet the requirements of manufacturers, and whether/how they will actually be integrable/integrated into the laminated structures in question. The prior art also ignores questions related to the integration in the same glazing of these lighting means and of those allowing the control of transmittance. The inventors therefore propose solutions to these questions.

A requirement related to the mode of lighting concerned is to have sufficient power, in particular for the construction of readers.

It has already been envisioned to use LEDs to display information in luminous form. The display of information requires only a relatively low power, even when the display is located on a glazing exposed to light from outside the vehicle, or, in other words, even when the display is contre-jour. The light emitted by LEDs is concentrated on a very small area so that a sufficient contrast is obtained to outside light even with a limited power. The same is not true for "lighting" applications. To a certain extent, a point power source may even be disadvantageous. There is a risk of dazzle if these very bright point sources are looked at directly, this risk increasing as the delivered power increases. The retinal persistence that this dazzle can cause is a phenomenon which gives rise to standards to be complied with (IEC62471). According to this standard the lighting on the request of manufacturers must remain for example at the "RG1" level.

It is necessary to take into account elements that attenuate the light emitted by the diodes, and in particular the fact that, depending on the glazing in question, a relatively large amount of light is absorbed in the sheets of glass, interlayers and any element placed on the path followed by the luminous flux emitted, when determining the luminous power required to provide a given level of illumination.

The luminous power required by the lighting according to the invention is advantageously apportioned between a plurality of diodes. Using a multiplicity of diodes has a number of advantages. A first advantage is, for example, that only diodes of lower individual power may be used. Even though the power of commercially available diodes has considerably increased, those of moderate power remain advantageous, if only because they are less expensive. They are also advantageous insofar as the luminous efficacy of the most powerful diodes is not the best. It is therefore preferable to choose diodes from power ranges corresponding to the best efficacy. This way of proceeding also addresses the need, about which more is said below, to limit the negative consequences associated with the thermal conditions under which the diodes are used.

The energy conversion efficiency of diodes has also significantly improved over time. For a given power, the amount of heat generated by recent products has tended to decrease. Nonetheless, the best energy conversion efficiencies—i.e. the percentage of electrical power converted into light—generally does not exceed 30% and most commonly is about 15 to 20%. Therefore, a substantial amount of heat is generated by Joule heating.

The position of the diodes in the laminate does not make removal of the heat generated during operation easy. For high power the operation of a diode may lead to local heating such that it eventually brings about an impairment of the diode itself, of the solders in the power supply circuit, or of the elements present in the laminated roof in contact with or in immediate proximity to the diode, liquid-crystal films, in particular. Though glass sheets can without damage withstand a temperature rise, other constituents, in particular the liquid crystals, make it necessary to maintain the temperature within relatively strict limits, usually less than 100° C. and even often less than 85° C. For this reason it is preferable according to the invention to distribute the necessary total power over several diodes, each offering only a fraction of this total power, these diodes moreover remaining quite some distance apart.

Experimentation allows the variation of the temperature of a diode of given power in an environment such as that corresponding to a laminated glazed roof to be evaluated. This evaluation takes account of the fact that, for a diode, heat is dissipated essentially by conduction through the materials making contact therewith. Thermoplastic interlayers made of materials such as PVB are not good conductors, neither are sheets of organic or mineral glass. Care must therefore be taken to restrict the power of the diodes used. Experimentation shows that under the envisaged conditions of implementation and energy conversion efficiency of available diodes, the electrical power preferably must not exceed 2 w, and usually must not exceed 1 w or even 0.5 w. If, as expected, progress is made toward better energy conversion efficiencies, or in other words smaller fractions of power are dissipated in the form of heat, power could then be increased without risk. Continuation of this progress may lead to the use of diodes of up to 4 or even 5 w.

For a given electrical power, diode luminous flux may vary to a large extent. So as not to have to needlessly multiply the number of diodes required, and complicate their integration in the laminate, the power of the diodes used is not less than 15 lm/w and preferably not less than 40 lm/w and in a particularly preferred manner not less than 75 lm/w. Conversely it is preferable not to increase their power excessively so as not to run the risk of heating prejudicial to their longevity and/or the impairment of other constituents of the laminate. The individual power of the diodes advantageously remains lower than 100 lumens per electrical watt.

The luminous power required may vary substantially depending on the vehicles and use in question (reading light, ambient or courtesy lighting).

By way of indication, for a reading light the illumination required is of the order of 10 to 100 lux i.e. a luminous flux on the illuminated object, dependent on the configuration of the cabin of the vehicle, which is not less than 1 lm, preferably not less than 2 lm and may reach 50 lm or more. For ambient lighting of the cabin the luminous power is normally a bit lower. The illumination ordinarily is not less than 1 lux and may reach 10 lux or more. Under these conditions the luminous flux for the ambient lighting for the whole of the cabin may range from 2 to 60 lumens.

Another factor influencing the lighting is related to the orientation of the luminous flux. For the most commonplace diodes the emission spreads throughout the space facing the diode. To do this the diode comprises a reflective element that directs the flux to just one side. It will be noted that though the diodes may be equipped with optical means that concentrate and direct the emitted luminous flux, these means are ineffective when they are surrounded by a medium of similar refractive index. These optics consisting of synthetic materials of epoxy resin type do not exhibit a sufficiently different index from the thermoplastic materials of the interlayers of the laminate such as polyvinyl-butyral or EVAs. Therefore, additional means are advantageously used to control the direction of the beam. Example embodiments are presented below.

In practice, for reading-light applications, the power of the diodes is chosen while taking account of the absorption of the constituents of the glazing, in such a way that the luminous intensity emitted from the glazing in a solid angle of 40°, normal to the plane of the glazing, and by each diode, is not less than 10 cd and preferably not less than 15 cd.

On account of the luminous flux emitted by the most appropriate available diodes, a reading light advantageously comprises from 2 to 20 diodes and preferably from 6 to 15. For more powerful diodes, just one of them could suffice, if it were efficient enough. For general lighting of a cabin, the number of diodes depends on the size of this cabin, it may be much higher than in the preceding case. Referred to the area of the roof, the number of diodes distributed over this roof, can advantageously be of the order of 6 to 40/m$^2$, and usually from 10 to 30/m$^2$.

Whether it is a question of a reading light or ambient lighting, it is preferable to keep the diodes a certain distance from each other in order to make it easier to dissipate the heat that they generate. A spacing of 10 mm at least between each diode is preferred, and advantageously of at least 20 mm.

With conventional packaging the luminous flux emitted by the diodes forms a beam of large beam angle, which angle may be as large as 180° and is at least 120° depending on the package used. This particularity, when the diodes are uniformly distributed over the roof, befits well ambient or courtesy lighting.

If the light beam has a large beam angle, its intensity is not uniform in all directions. Its intensity is highest in the direction normal to the plane of the semiconductor of the diode, and decreases until the largest beam angle is reached. This distribution is described in greater detail below by way of an example and the associated figure.

Even though the intensity is higher in one direction, which may be chosen by suitably locating the diodes in the roof, this intrinsic partial "directivity" may not be enough. It may be preferable to direct the flux so as to obtain a beam of small beam angle.

To decrease the beam angle of a light beam originating from one or more diodes, a convergent lens is advantageously formed facing them. If this lens is diode mounted, for it to remain effective in the laminate its refractive index must differ from that of the interlayer material in which it is inserted. The most commonplace products have an epoxy resin lens the refractive index of which does not differ substantially from that of conventional interlayer materials. In this situation, to obtain the required convergence, the lens is placed not on the diode but on the face of the glazing facing toward the cabin i.e. in position 4. In principle, the lens in question may be formed by modifying the surface of the glass sheet itself and thus be an integral part thereof. Nevertheless, for reasons of cost of implementation, it is advantageous for the lens to take the form of an added part that is placed facing the diodes. The part in question is made of a transparent material that may be glass, but also, if needs be, a sufficiently transparent and resistant polymer.

Fresnel lenses are preferred in order to minimize protrusion of this added lens into the cabin. With such a lens it is possible to choose the beam angle of the beam that corresponds best to the size of the zone that it is desired to illuminate. For reading lights, a beam angle of 15 to 40° allows the size of the illuminated zone to be adjusted to take account of the distance separating the source from this reading zone.

For fixed directional lighting, the lens is placed on the internal face of the glass sheet facing toward the cabin and unmodifiably bonded to this face adhesively. It is also possible to envision an orientable beam the direction of which may be modified, for example via translation of the lens over the face of the glass sheet. Such a means requires a device to be present that necessarily adds to the protuberance at the surface of the sheet.

The light beam may be limited as indicated above by a sort of diaphragm associated for example with each diode. This way of proceeding, contrary to the optical device, allows only a limited fraction of the emitted flux to be delivered. It is also possible to combine use of the diaphragm and a lens such as indicated above.

Advantageously the glazings according to the invention are composed in such a way that the light measured (according to the ISO9050 standard) penetrating by transmission and diffusion (transmittance) in the activated state of the LC film, is not greater than 30% of the incident light and preferably less than 20% or indeed even 10%. This proportion may be much lower. Nonetheless the glazings according to the invention advantageously exhibit an overall rate of transmission and diffusion (transmittance) in the activated state of the LC film, which is not less than 3% and in a preferred manner not less than 5%.

The transmission in question can be adjusted in various ways as indicated hereinafter, in particular by the use of sheets which absorb a share of the incident light, but also partially by the LC film.

When the absorption is obtained by the glass sheets and interlayers, globally and/or individually these elements may be very absorbent. But a strong absorption of this type can also be advantageous in the composition of roofs comprising transmittance control elements, so as to further reduce the luminous and energy-related transmission and/or for example to control the coloration of the glazing.

The choice of the LC films in laminated roofs makes it possible to satisfy the privacy aspect requirement and the absence of dazzle.

Having regard to the structure of the LC films and of their mode of action, for one and the same fill of liquid crystals per unit volume of the active part of the film, it goes without saying that the diffusing effect increases with the thickness of the film. In practice the commercially available products lead in the non-activated state to very significant diffusions of the order of 95% and more, for thicknesses generally of less than 0.5 mm, or even of less than 0.3 mm. Diffusions of this order are ordinarily sufficient to meet manufacturers' expectations so that greater thicknesses appear superfluous.

Note that in the production of LC films, the thickness also intervenes in the mode of conditioning of the constituents. By way of indication products of PDLC ("polymer dispersed liquid crystal") type may be relatively sensitive to deformation under pressure. To prevent undesirable deformations the thickness can be maintained by introducing rigid transparent particles into the polymer, forming so many spacing shims. Nevertheless in order not to impair the optical properties it is preferable to be able to limit the thicknesses and the presence in quantity of these particles.

A condition required by manufacturers is to make provision, when the LC film is subjected to the electric field in the activated mode, that the residual diffusion, also referred to as haze, be as small as possible so that the visual perception through the glazing, at least under certain angles of incidence, approximates transparency.

Haze is measured according to the ASTMD1003 standard. In the use of LC to control the luminous characteristics the luminous flux transmitted comprises the diffused light and that which may possibly be transmitted directly. The measurement is made with integration sphere to take account of the specifics of the diffused light. The measurement as a whole is referred to as "transmittance". The measurement of transmittance is performed according to the ISO 9050 standard, the determination is made for a D65 illuminant and for an angle of 10°. In the same manner the reflection measurements are made according to the same standard, same illuminant and same angle. The energy transmission is measured according to the ISO 13837 standard.

When the LC film is not activated there is practically no direct luminous transmission. Practically all the light transmitted is in diffuse form.

Having regard to the fact that the luminous absorption organized in particular by the glass sheets and those of the interlayer sheets, necessarily reduces the transmitted light, the presence of haze on account of the LC film is less perceptible to the observer. For this reason degrees of haze which would be considered to be crippling for clear glazings are nonetheless acceptable in the roof application. Nonetheless, to meet manufacturers' expectations, the haze in the roofs according to the invention, through the choice of the LC films, is advantageously maintained at less than 12%, preferably is not greater than 10% and in a particularly preferred manner not greater than 8%, when the glazing is activated by the application of the appropriate electric field. The measurement in question is made in a direction substantially orthogonal to the surface of the glazing.

The diffusion rate, in a known manner, can be modulated as a function of the applied electric field. The orientation of the crystals is directly dependent on this field. The increase in the field remains limited to what the films can withstand without risk of breakdown, corresponding to a short-circuit between the electrodes which cover the functional material consisting essentially of polymer containing the liquid crystals. The voltage that can be withstood may depend in part on the thickness of the film. For the reasons indicated previously this thickness is limited. Under these conditions the voltage that can be withstood for commonplace films is of the order of 220 V.

Moreover, in practice for commercially available films, the diffusion is no longer reduced perceptibly beyond a threshold which does not exceed the applied voltages of the order of no V. For the determination of the residual haze according to the invention, the measurement is made at the value of 65 V in alternating mode of frequency 50 Hz. The haze values indicated hereinabove are measured under commonplace outside conditions, in particular of ambient temperature.

LC films always preserve a residual diffusion as indicated hereinabove. Though this diffusion must be limited in the direction orthogonal to the surface of the glazing, it also preferably remains relatively low at angles of incidence which deviate little from the normal. The diffusion tends to increase as one deviates from the orthogonal direction. In the activated state, the diffusion preferably remains according to the invention less than 20%, and in a particularly preferred manner less than 15% for an angle of observation of up to 20° with respect to the normal to the surface.

As indicated hereinabove the residual diffusions may not be totally eliminated, but perception thereof is all the less bothersome as the light is in part absorbed by the various elements constituting the glazing. The LC film contributes for a limited part to this absorption be it activated or not. The remainder of the absorption is mainly on account of the glass sheets and possibly of the interlayer sheets.

Liquid-crystal electro-controlled systems in "transparent" configuration contribute to absorption but in a limited manner. If the desired transmission, for the reasons set forth further on, must be substantially lower, the glass sheets and interlayer sheets must participate in an appreciable manner in reducing transmission. This absorption in this case may still be very significant. It is preferably at least 60% or more. The absorption in question intervenes whether the device is in the "transparent" or "diffusing" state. In the transparent state it contributes to reducing the luminous and energy-related transmission, possibly participates in the masking of the elements contained in the glazing, and in the masking of the residual diffusion.

Though the glass sheets used to constitute the laminate can in principle be of the same composition and optionally of the same thickness, and this may render prior shaping easier, the two sheets being for example bent simultaneously, it is preferable that they do not exhibit the same properties as regards absorption, for reasons of protection of the liquid-crystal film.

The glass sheets are preferably chosen so that the transmitted light, just like the reflected light, is of as neutral as possible a color. Overall, the glazing has a gray or slightly bluish color.

The possible presence of colored interlayers participates in the absorption of light. Their use is envisaged for glazings whose glass sheets would not be sufficiently absorbent overall. This situation is encountered in particular when the protection of the liquid-crystal film involves the use of a weakly absorbent outward facing glass sheet.

The presence of colored sheets in the glazings comprising an LC film also contributes to the rendering of colors which are satisfactory. Usually, LC films tend to exhibit a slightly yellow coloration in particular in reflection. It is desirable, in order to avoid this look perceived by the passengers of the vehicle, to provide for the glass sheet, and optionally an interlayer sheet disposed between the LC film and this glass sheet facing toward the cabin, to be colored so as to mask this yellow shade. Usually a glass sheet of neutral coloration is chosen, preferably gray or bluish gray. In the same manner an interlayer sheet disposed above the LC film can mask the coloration due to the LC film seen from outside the vehicle.

The choice of color of the glass sheets and/or interlayer sheets is such that the coloration in reflection in the cabin leads in the CIELab system (D65 illuminant at 10°) to values such that:

$$10<L^*<55, -10<a^*<3 \text{ and } -10<b^*<5$$

and preferably:

$$-6<a^*<0 \text{ and } -6<b^*<0$$

The roofs according to the invention must still advantageously meet requirements as regards the significance of the interior reflection. The latter, whatever state the LC film is in, is preferably less than 15%, and advantageously less than 10%

For reasons not only of esthetics, but also of safety, roofs must not exhibit excessive outward reflection in the visible region, whether in the activated state or not. It is preferably less than 20%, and in a particularly preferred manner less than 15%.

Manufacturers, for esthetics reasons this time, also require that the outside reflection be relatively neutral, stated otherwise that the apparent color of roofs not be too accentuated. In particular purple tints must be avoided. Gray or bluish shades can harmonize with the most widespread tints for vehicles.

According to the CIELab colorimetric data (D 65 illuminant at 10°), the color under outward reflection, in the activated state or not, is preferably within the following limits:

$$10<L^*<60, -12<a^*<3 \text{ and preferably } -7<a^*<2$$

$$-12<b^*<5 \text{ and preferably } -2<b^*<1$$

The color in transmission must also be controlled. In the unactivated state, the transmission being very low the color is hardly perceptible. The transmission in the activated state is preferably such that:

$$15<L^*<75, -10<a^*<5 \text{ and preferably } -8<a^*<0$$

$$-10<b^*<3 \text{ and preferably } -5<b^*<3.$$

The color rendering index for the transmitted light is at least 85 and preferably 90.

In practice it is particularly desired that the overall energy transmission penetrating into the cabin be as restricted as possible in particular when the vehicle is parked, and therefore when the LC film is not activated. According to the invention the energy transmission of the glazing under these conditions is advantageously less than 10% and preferably less than 8% or indeed even less than 5%. In the activated state, the energy transmission is a little higher but remains limited on account of the other constituents of the glazing.

To remain under appropriate conditions of energy transmission, apart from the already specified elements, the glazings according to the invention advantageously comprise means selectively filtering the infrared. Filters of this type are in particular those comprising one or more metallic thin layers, based on silver, associated with dielectric thin layers which contribute to the selectivity of the filter. These assemblies of layers are disposed either on a carrier sheet, in particular of PET, inserted into the laminate, or by direct application onto the glass sheet. In both cases this filter is situated in the laminate above the LC film, so as to contribute significantly to the protection of this film.

The system of layers chosen is advantageously a system that contains a number of silver layers, in order to obtain an effective filter, and that allows color, especially in reflection, to be controlled. A particularly effective assembly of layers is such as described in patent application WO2011/147875. In this application, the recommended system comprises three silver layers and dielectric layers, the assembly being chosen, especially the thicknesses of the silver layers, such that the color in reflection is satisfactory even at low incidences of observation.

A particular feature of liquid-crystal films is indeed their sensitivity to temperature. Beyond 80, or even 60° C., they may no longer react to the variations of applied electric fields. This impairment is reversible as long as the temperatures do not reach much greater levels. The temperature of roofs exposed to intense sunshine can reach these values all the more easily the more absorbent their constituents.

To prevent heating one therefore endeavors to place the infrared filters in question as early as possible along the path of the incident light. To minimize the absorption of infrared, the first glass sheet exposed is preferably of clear or even extra-clear glass. The infrared-reflecting systems are also preferably applied directly to the glass sheet. Thus the reflected incident radiation merely passes through the clear glass sheet twice and leads to a small increase in the temperature.

The components of the LC films may be degraded by excessive exposure to UV. The choice of the interlayers makes it possible to considerably limit this exposure. Such is the case in particular for PVB interlayers, which by nature form a screen to UV allowing through only a very small proportion of the latter. For the standard PVB films 0.38 mm thick, more than 95% of the UV is absorbed. This proportion can exceed 99% by supplementing with additional absorbent agents ("PVB UV cut"). Polymers based on ethylene vinyl-acetate (EVA) are also proposed which encompass components that confer upon them very weak transmission of UV.

The glass sheet facing toward the cabin may also, exceptionally, be made of clear glass. It is most often absorbent and contributes to the overall decrease in energy transmission. When its transmission is limited, it allows non-transparent elements present in the glazing to be at least partially masked from the sight of passengers. Such is the case for example for the diodes themselves when they are not activated, but also for any element incorporated into the glazing and which does not extend uniformly over its entire surface.

In a preferred manner the glass sheet facing toward the interior of the cabin is strongly absorbent. The light emitted by the diodes is in part absorbed. Preferably the light emitted by the diodes which is absorbed in the glazing is preferably not greater than 50% and preferably not greater than 40%.

For the formation of reading lighting the light emitted, independently of the modifications due to passing through the glazing, is preferably white or very slightly tinted. The (x, y) color coordinates in the CIE 1931 system, characterizing the lighting, taking into account, on the one hand, the emission of the diodes but also, on the other hand, the transmission through interlayers and the glass sheet that is facing toward the cabin, are such that they are advantageously inscribed in a perimeter defined by the points with coordinates: (0,2600;0,3450), (0,4000:0,4000), (0,4500:0,4000), (0,3150;0,2900), (0,2350;0,2000), which perimeter includes both so-called cold lights and warm lights, and preferably in the perimeter defined by the points with coordinates which is aimed more precisely at very weakly colored lights.

Generally, regarding production of the roofs according to the invention, it is recommended to bear in mind the capacity of the constituent elements to withstand the processing used to shape and assemble the glazing. The roofs of vehicles generally have curvatures that are relatively unaccentuated except possibly those of the edges of these glazings. The shaping of mineral glass sheets comprises, at least for one of them and most often for both, processing that requires exposure to a high temperature (650-700° C.) that causes the glass to soften.

An alternative consists in undertaking the formation of a laminated glazing allying a relatively thick bent sheet with a plane sheet of smaller thickness which is forced mechanically to hug the curvature of the thick sheet. It is envisioned to implement this technique only if the required curvatures remain relatively modest on account of the stresses that are able to be withstood, especially by the glass sheets. This type of assembly is for example such as described in patent application BE 2011/0415 (filed Jul. 4, 2011) or even in patent application BE 2012/0036 (filed Jan. 16, 2012). In the case of this type of assembly, the system of layers, even when it is relatively fragile, provided it is placed on the planar sheet, is exposed only to the temperature of the stoving that concludes the assembly of the laminate.

In this assembly mode, the planar glass sheet is advantageously a chemically tempered glass sheet.

In practice the LC films are sensitive to temperature rise, but the thermal treatments to which they are led on assembling them in the laminate, do not impair them. The treatment in question is usually that of stoving under pressure, at most at 120° C.

It is apparent to the inventors that assembling an LC film in a laminated glazing often introduces a modification relating to residual diffusion. Without the mechanism having been studied precisely, a reduction has been noted in the residual haze in the laminate with respect to that observed on the film alone. This limited reduction is perhaps to do with a modification of the state of the external surfaces, that of the film alone consisting of the walls of the electrodes (PET film usually), whilst in the laminated product the external surfaces are those of the glass sheets whose roughness is much reduced.

The insertion of the LC film into the laminate is preferably facilitated by fitting a housing accommodated in the interlayer sheet or sheets.

The conditions of introduction of the diodes, like that of the liquid-crystal films, must take account of their relative fragility either at high temperatures or to mechanical stresses. The nature of the diodes normally makes it possible to withstand the assembly temperatures provided that they are not imposed over very long periods and/or under aggressive chemical environmental conditions. Nevertheless, the temperature in question requires a few precautions to be taken as regards the choice of the materials used to form the connection between the diodes and their power supply circuit. This connection is sensitive to heat especially when it is formed by means of conductive glues. Using solders allows, if needs be, higher temperatures to be withstood.

The mechanical stresses are mainly a result of the pressures resulting from the assembly. To minimize the effect of these pressures, it is necessary to arrange the diodes so that they insert into the material of the interlayers without excessive force.

A first condition is to ensure that the interlayer is thick enough to allow the diodes to be inserted.

Conventional diodes with their packaging are ordinarily less than 1.5 mm in height, and most often less than 1 mm or even less than 0.7 mm in height. The heights in question are perfectly compatible with the thickness of the conventional interlayers used. By way of indication, PVB sheets that are 0.76 mm and 0.38 mm in thickness are commercially available. Furthermore, it is conventional in these laminated glazings to associate a plurality of interlayers as needs be. According to the invention, the thickness of the interlayers is therefore at least equal to the height of the diodes. As an additional precaution, the thickness of the interlayer intended to envelop the diodes is chosen to be larger than the height of the diodes, for example 1.5 times this height or more, whilst being no more than required in order not to increase the total thickness of the glazing unnecessarily.

The mechanical resistance of the diodes, and even more so of their connection to the power supply circuit, must allow them to be inserted into the material of the interlayers during the assembly. Conventional ceramic packaging is highly resistant. The interlayer material is customarily softened enough during the stoving to allow the diodes to be inserted simply by applying pressure.

The process described above may be replaced by a more unusual one in which the interlayer is formed from a material applied in fluid form at room temperature before being set, for example by cross linking, once the various elements have been put in place.

The power supply circuit of the diodes may be formed in various ways. One of them consists in using thin wires, which are advantageously inserted into the interlayer with the diodes as described in EP 1 979 160. The presence of these very thin wires is practically imperceptible if the glazings have, systematically, a low luminous transmission. The main difficulty with this embodiment is with placing the diodes in the interlayer.

It is preferable, according to the invention, to arrange the power supply circuit and the diodes on a carrier that is distinct from the interlayer materials. It may be a question of one of the glass sheets of the laminate, provided that this sheet does not need to undergo a heat treatment of the type used for bending. One way forward consists, for example, in bending a sheet coated with a conducting layer. In this layer, the power supply circuit is formed before or after the bending has been carried out. Once the sheet has been bent, the diodes are arranged in appropriate locations on the power supply circuit. However, fitting diodes to a curved substrate is an operation that remains difficult to automate.

The alternative mentioned hereinabove, consisting in undertaking the formation of a laminated glazing allying a relatively thick bent sheet with a plane sheet of smaller thickness which is mechanically forced to hug the curvature of the thick sheet avoids the difficulty of having to place the diodes on a curved sheet. The implementation of this technique is envisaged only assuming that the curvatures imposed on the plane sheet remain relatively modest having regard to the stresses that can be withstood.

In order for the diodes to lead to as intense as possible an illumination, they must be as close as possible to the glass sheet facing toward the cabin. In the case envisaged of the relatively thin plane sheet bearing the diodes, the latter are necessarily situated on the convex face. In this position the conducting supply layer powering the diodes withstands extensile stresses. This does not cause any particular difficulties because the curvatures remain low and the stresses limited. Nevertheless, one particularity is a result of the type of diode used. Specifically, it is necessary to direct the luminous flux away from the side corresponding to the carrier of the diodes constituted by the glass sheet. In this case, the diodes used are necessarily of the "reverse" type.

In the mode of assembly presented hereinabove, the conducting layer serving for the fashioning of the power supply circuit is formed on the thin sheet. It is not easy to apply the layers when the glass sheets in question are very small in thickness (for example 0.8 mm or even about 0.4 mm in thickness). The techniques customarily used to constitute these layers induce defects in particular because of the difficulty in properly controlling the planarity of the sheets at the stage of applying the layers.

Given the difficulty of handling relatively thin sheets of large size, on which the diodes are fixed beforehand, it is possible to proceed in a different way. It is a question of inserting, into the laminate, an element independent from the actual glass sheets and interlayers themselves. In this mode the circuit and the diodes are arranged on a thin carrier element that is inserted into the laminate. This carrier element may be relatively small in size relative to the area of the roof. The size of the carrier element is advantageously limited to that required to place the diodes appropriately. For a reading light for example the area of the carrier may be limited to a few square decimeters or less.

The carrier is advantageously formed by a flexible polymer sheet. The resistance to deformation of the sheet in question is advantageously high enough to maintain the orientation of the diodes during their insertion into the interlayer material. The sheet may be composed of a number of superposed materials. It may especially comprise a sheet of polyethylene glycol terephthalate (PET) or similar serving as a carrier for the conductive circuit. Sheets of this type coated with a system of conducting layers are commercially available. For these polymer elements the fixing of the diodes can only be done without noticeable rise in temperature because of fragility of the material in question at high temperatures. The diodes are for example fixed in place by means of a conductive glue. PET sheets are very resistant to stretching, but are very flexible. They are therefore advantageously associated with a sheet made of a material that can be less easily deformed flexurally in order to make it easier to position the diodes correctly.

The carrier element holding the circuit and the diodes may also advantageously be formed from a thin glass plate. Having regard to the dimensions, which may be limited, the plate can be of particularly small thickness, for example 0.5 mm or less. Sheets of such small thickness have the advantage of being easily deformable to match the curvatures of the laminated roof. To improve the resistance to bending these sheets are advantageously chemically tempered. Moreover, elements made of glass are able to withstand temperatures that are compatible with the use of a solder to fasten the diodes to the circuit.

The inserted carriers in question hereinabove are of essentially transparent materials. They do not modify substantially the luminous transmission properties of the roof. Because of the modest dimensions of these carriers, and assuming that it is acceptable to have non-transparent parts, it is possible to use traditional materials in the construction of electronic circuits of the PCB ("printed circuit board") e, these products exhibiting the advantage of being very inexpensive.

Insertion of the diode carrier is preferably facilitated by producing a housing in the one or more interlayer sheets. This mode is conventionally used to insert various elements, especially photovoltaic cells, into laminated glazings and even into roofs as in EP 1 171 294.

The composition of the power supply circuits must satisfy a number of requirements. First, if as is preferred in order to best preserve the uniformity of transparency, use is made of a diode carrier which is transparent, the power supply circuit will itself preferably be such that it does not substantially modify the luminous transmission, or, more precisely, that its presence remains practically indiscernible visually. In this case, the circuit is for example constructed in an essentially transparent conductive coating. However, very thin wires may also be used.

For the transparent circuits, use is advantageously made of conducting thin layers of the so-called "TCO" ("thin conductive oxide") type, or of systems comprising at least one metal layer. These conducting layers are very thin and are used in many fields, in particular that of photovoltaic cells. The conductivity of such oxide layers is lower than that of metal layers, which normally means they must be substantially larger in thickness. In all cases, even for thicknesses of several tens of nanometers, the limited impact on luminous transmission is not bothersome having regard to the very weak overall transmission of the glazing itself.

The choice of the conducting layers must also take their electrical properties into account. Conductive oxide layers ordinarily have relatively low conductivities, or in other words non-negligible resistances. Conductive oxide layers for example have a resistance of about 10Ω/□ or more. The systems comprising metal layers have lower resistances, of the order of 1 to 5Ω/□, but exhibit a certain fragility which implies that in spite of their qualities conducting oxide layers remain preferred.

In practice it is important to maintain the resistivity of the layer at a sufficiently low level so as not to have too significant a Joule effect when supplying power to the diodes. As for the diodes, additional heating, which increases proportionally to resistance, must be avoided even if it means distributing the heat generated over the entire area occupied by the conducting layer.

The electrical circuit used to supply power to the diodes is formed in the conducting layer in a conventional way. For a carrier consisting of a thin glass plate, a conventional mode consists, for example, in cutting out the layer that beforehand uniformly covers the carrier. This cutting out is advantageously carried out by laser ablation. For carriers consisting of thin films, such as those of PET, the circuit is preferably formed using printing techniques.

Placing a glazed roof on a vehicle targets, in part at least, an objective that is equally aesthetic in nature as functional. For this reason, it is preferable for all the means associated with these roofs to contribute to the achievement of this objective. The presence of lighting means contained in the roof must necessarily be accompanied by a specific power supply and the controls of these means.

The diodes require a specific voltage. As indicated above, this voltage is about a few volts (most often 2 to 4 V). It must necessarily comprise means for adjusting the voltage which powers the vehicle's other members, the latter depending on whether one is dealing with cars or big utility vehicles is of the order of 12 to 14 V or of the order of 48 V. Even if miniaturized the means for transforming the voltage cannot be fitted into the laminate of the glazing. With regard to the need to keep all the elements contributing to the function close together, the required transformer(s) may be placed in proximity to the glazing. Advantageously, the transformer is placed under the enamel zone that masks the edges of the glazing.

The lighting may be controlled by simple switches. In the traditional modes the switches are situated in immediate proximity to the lighting means so as to avoid complex circuits and facilitate the identification of the actuated means. Conventional switches do not meet the desire for transparency from which the choice of glazed roofs stems.

The invention proposes to use means for controlling the diodes that are also essentially transparent. For this purpose, the invention proposes to use switches the operation of which is triggered by way of relays actuated by a pulse associated with an electrical quantity. Preferably the switch used is a capacitive switch. This mode allows the actual structure of the elements included in the roof with the diodes to be optimized.

The sensor is preferably devoid of direct contact. In this case, the sensor is located inside the glazing. Advantageously, the sensor is incorporated in the conducting layer in which the power supply circuit of the diodes is formed. This sensor for example consists of a defined zone independent of the power supply circuit of the diodes. The capacitance variation is then induced indirectly by an electric field variation by moving the hand toward the location of the electrode in the glazing. The fact that a glass sheet is interposed limits the induced variation and as a result the detection threshold is lowered possibly leading to an increased sensitivity to parasitic triggering.

It is especially recommended when setting the sensitivity level to ensure that the threshold at which the switch triggers is higher than that which corresponds, for example, to the presence of water on the exterior glass sheet. The infrared-reflecting system disposed above the liquid-crystal film and covering the whole of the glazing constitutes a screen impeding these parasitic triggerings and which is all the more effective as it will be earthed.

The AC current supply powering the liquid-crystal film is liable also to induce a parasitic signal leading to much reduced functioning of the diodes. The earthing of the liquid-crystal film's conducting layer facing toward that powering the diodes makes it possible to avoid this parasitic functioning.

In the embodiments, it is preferable for the conductive circuits that supply power to the diodes to be barely perceptible or imperceptible in the roof. If a capacitive sensor is constituted, as indicated hereinabove, in the conducting layer, the latter is not easily discernible either. It is possible to make it easier for a user to locate this "switch" using tactile means. The presence of protuberant means, in particular of Fresnel lens type on the surface of the interior face of the roof, but a simple frosted overlay can suffice. It is also possible to locate the sensor in an optical manner by adding a diode of very low power supplied in a permanent manner as soon as the contact of the vehicle is actuated, or else in an analogous manner while keeping the reading light operating but at a very low operating level.

If the turning on of the diodes is advantageously controlled by a capacitive switch integrated into the glazing, the same holds for the control of the LC film. This control by dint of simplification is advantageously introduced into the glazing in the same manner as that controlling the lighting. Stated otherwise the electrodes of the capacitive sensor are formed in a transparent conducting layer applied to a likewise transparent carrier. It goes without saying that the pattern defined in the conducting layer is relatively simpler insofar as there are no lighting diodes powered from this conducting layer. Optionally, just as for the switch of the lighting, it is possible to deploy an element signaling the position of this switch, which is otherwise difficult to discern. A preferred mode consists of by presence of a positioning diode also powered from the conducting layer constituting the electrodes. This diode having regard to its role is of low power.

The invention is described in detail with reference to examples that are illustrated by the drawings, in which:

FIG. 1 schematically shows an exploded perspective view of a partial assembly of elements entering into the composition of a roof according to the invention;

FIG. 2 presents in a sectional schematic manner, along the axis A-A of FIG. 1, the various elements after they have been assembled;

Figure 5:
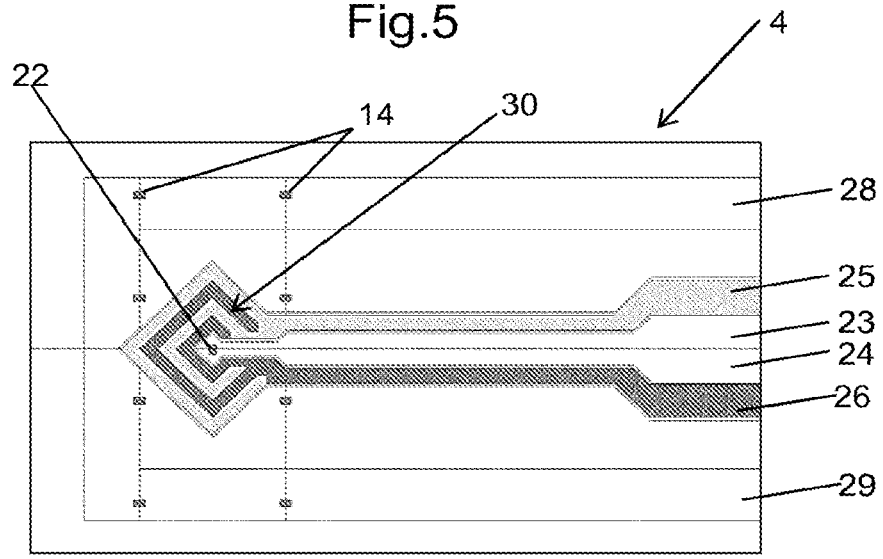
Figure 6:
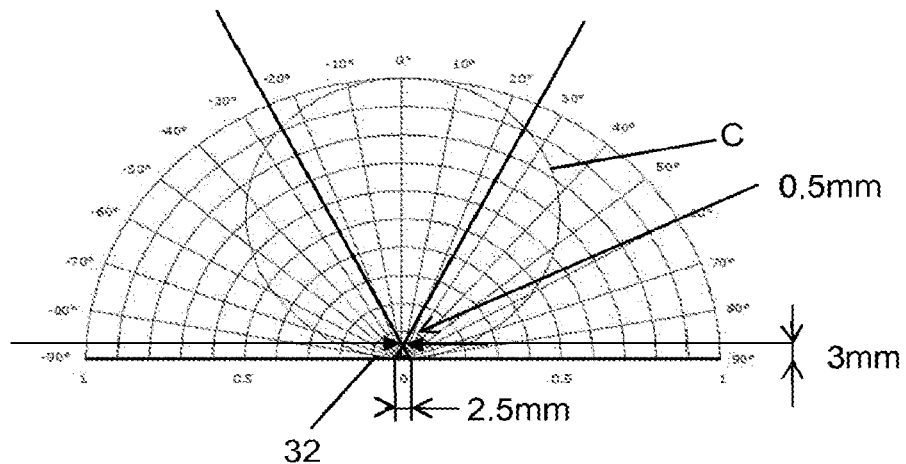
Figure 7:
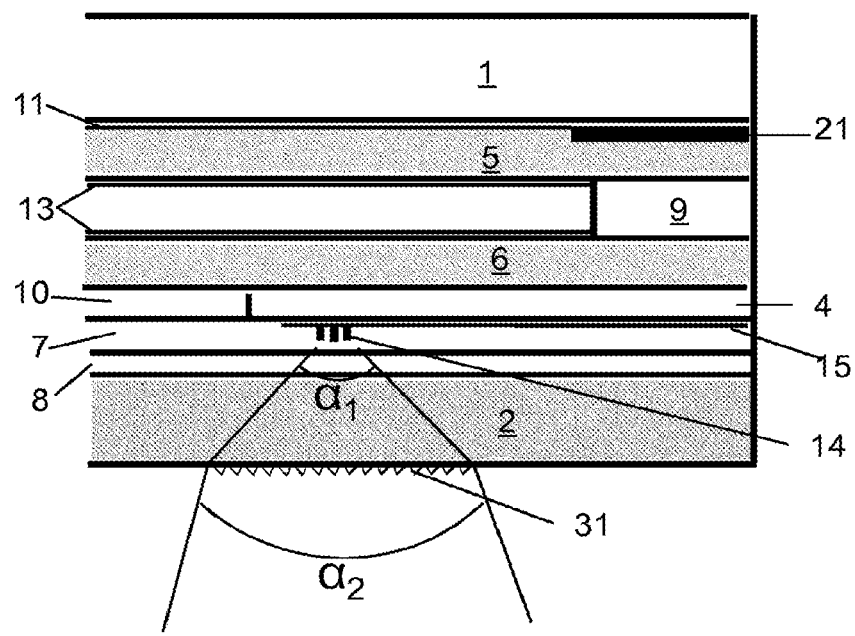

FIG. 5 schematically shows a power supply circuit for 8 diodes;

FIG. 6 is a schematic illustrating the luminous intensity distribution of a beam emitted by a diode;

FIG. 7 shows one way of controlling the light beam;

FIG. 8 presents on the CIE 1931 colorimetry chart the preferred perimeters of the colors of the light beam emitted by the diodes.

Figure 1:
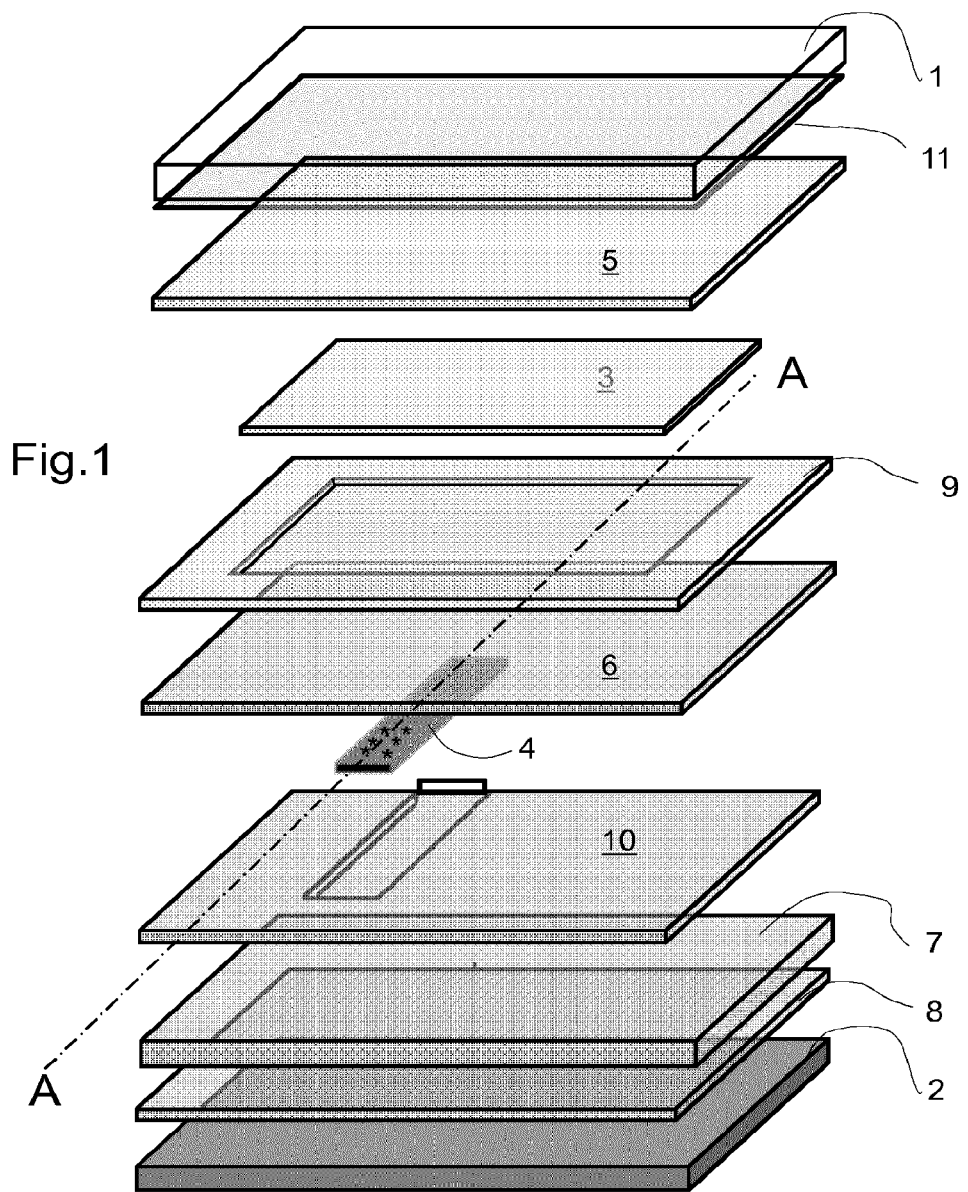

The assembly of elements of FIG. 1 constitutes an exemplary embodiment according to the invention. The elements are shown such as they are fo before they are assembled. In this figure the curvatures of the sheets are not reproduced for the sake of clarity. In practice, roofs, glazed or otherwise, exhibit curvatures which are ordinarily more accentuated on the edges where they are fixed to the bodyshell for a mating chosen for its "design", aerodynamics and the "flush" appearance, corresponding to good surface continuity between the contiguous elements.

The glazing shown schematically in FIG. 1 comprises two glass sheets, external 1, and internal 2. For the reasons set forth previously the sheet 1 is preferably of clear or even extra-clear glass so as to minimize its energy absorption. The internal sheet conversely is preferably strongly colored. It participates in limiting the luminous transmission so as to attenuate the perception of the unavoidable residual haze when the liquid-crystal film is in its transparent state.

In the example of FIG. 1 the sheet 1 is the carrier of an assembly if of infrared-reflecting layers. For the effectiveness of this IR filter, a stack of silver layers and of dielectrics is preferred, comprising two or even three silver layers as described in WO 2011/147875.

For the strongly colored sheet 2, use is made for example of a gray glass, such as described in patent FR2738238 or in patent EP1680371, or of a gray glass with green shade such as described in EP 887320, or with blue shade as in EP1140718.

In FIG. 1, the glass sheets are shown without the enamel patterns that are conventionally used to mask the edges of glazings. Enamels of this type could for example be placed on the internal face of sheet 1, therefore in position 2, concealing all of the adhesive joints and localized connections at the edge of the glazing. The masking enamels may also be located in position 4, in other words on that face of the glazing which is exposed to the interior of the cabin. It is also possible to place the masks in position 2 and in position 4.

The glazing according to the invention comprises at least two distinct functional elements, on the one hand a liquid-crystal film 3 and on the other hand at least one assembly 4 comprising lighting diodes. This assembly in the form presented is constructed on a carrier bearing a conducting layer forming the power supply circuit for a multiplicity of light-emitting diodes.

Sheets of interlayer materials are also present. These sheets whose general role is the assembling of the various components exhibit certain specifics.

A sheet 9 constitutes a frame for the liquid-crystal film 3, the latter not extending as far as the edge of the glazing. The frame corresponds to the dimension of the film in such a way that the latter fits in a tailored manner. It protects the sensitive material containing the crystals in question, from contact with the medium outside the glazing, in particular moisture. This frame 9 is of a thickness similar if not identical to that of the film itself so that the insertion of the film 3 into the laminated glazing does not bring about any local difference in thickness liable to cause delaminates.

A sheet 10 is arranged so that it leaves a housing in which the assembly 4 carrying the diodes is inserted when it is of a certain thickness. The figure presents a single assembly 4 to illustrate as simply as possible the construction of the glazing. In practice for means constituting reading lights, several analogous assemblies are distributed in the roof of the vehicle.

Figure 2:
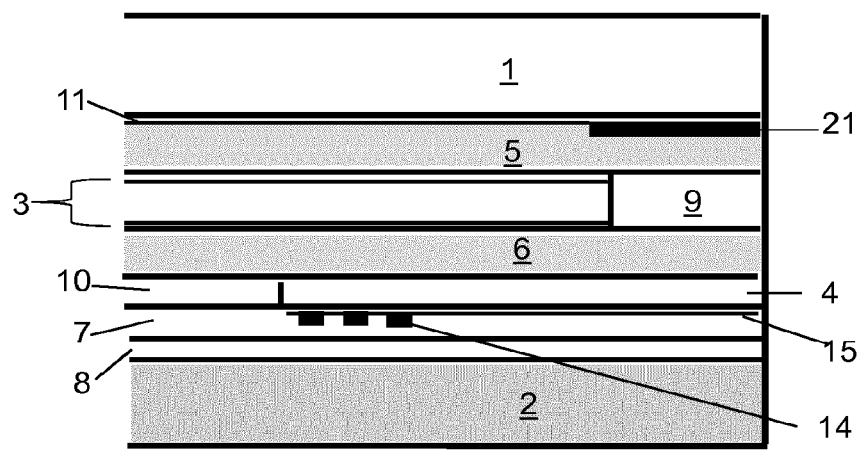

In the example presented, the carrier of the diodes 6 consists of a clear glass plate 4 (for example of 0.45 mm thick). The diodes 14 are welded or glued on the power supply circuit constituted in a conducting oxide layer 15 (FIG. 2). The height of the diodes on the glass plate 4 is for example 0.86 mm.

The interlayer sheet 5 is advantageously a sheet chosen for its role of UV screen. It is for example anti-UV specific PVB. Moreover the glass sheet 1 advantageously being of clear glass, the color of the glazing seen from the outside can be determined by that of the interlayer sheet 5. It is possible in particular to choose the interlayer so as to harmonize the color of the roof and that of the remainder of the bodyshell.

Figure 3:
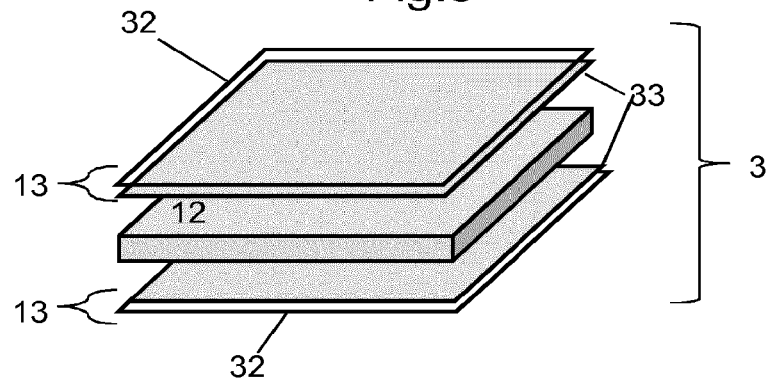
FIG. 3 shows a detail of the LC film of FIG. 1.

The structure of the liquid-crystal film is most usually of the type presented in FIG. 3. It comprises the liquid crystal functional layer 12 flanked by the two electrodes 13 which allow the application of the electric field. The electrodes 13 advantageously consist of a flexible carrier, for example a thin sheet of PET 32, clad with electrically conducting transparent thin layers 33. These layers are for example of ITO ("indium tin oxide").

The sheets of thermoplastic material 5 and 6, made of a traditional material such as PVB, allow the gluing over the whole surface of the liquid-crystal film 3 whose PET faces require the presence of material ensuring the mutual adhesion of the elements, which PET alone does not allow.

Though all the interlayer sheets offer a certain transparency to the visible spectrum, in the example the sheets 5 and/or 6 are strongly tinted so as to tailor the overall transmission of the glazing in combination with the absorption due to the tinted glass sheets. In the usual tinted PVBs the absorption by a single sheet of traditional thickness may be insufficient. This is the reason why in the example two sheets are made of tinted PVB. In other configurations, with a thicker or more strongly tinted sheet, a single sheet suffices, preferably the sheet 5.

The nature of the interlayers may intervene in the properties of the glazing. Their chemical composition can lead to undesired reactions. For example it is known that the plasticizers of certain interlayers such as the most usual PVBs, can migrate, particularly under the effect of heat. This situation may for example occur on the edge of the LC film 3 in contact with the material of the interlayer forming the frame 9. The migration of plasticizer from the frame 9 toward the film 3 can cause local haze to appear. This unesthetic haze may be masked by the enameled bands 21. Nonetheless it is possible to prevent the appearance of this defect by using a means which avoids contact. This is for example obtained by interposing on the edges of the film 3 a barrier consisting of a thin film of PET. Another means consists in using as frame 9 only interlayers devoid of products liable to migrate, in particular products of EVA (ethylene vinyl acetate) type.

Another mechanism is liable to impair the optical quality of the glazing. As described in detail in application WO 2009/050195, the products of PVB type which encompass ions, in particular alkaline ions, can take a brown tint in contact with electrically conducting circuits. Moreover this impairment may be accompanied by a modification of the conductivity of the layers in question. The publication mentioned establishes that these impairments come from the presence of a certain content of monovalent ions, in particular residual alkaline ions present in certain materials of the PVB type. To avoid these drawbacks the use of interlayers encompassing ions of larger dimensions, which are therefore less mobile, is proposed.

For this reason it is preferred to use an interlayer sheet 7 which is in contact with the conducting layer 15 powering the diodes 14, in a material meeting these characteristics. By way of indication such a material is that marketed under the name TROSIFOL Solar by the company Kuraray.

The thicknesses of the various interlayers are preferably limited to that strictly necessary so as not to needlessly increase the thickness and therefore the weight of the glazing. The interlayer sheets are thus the thinnest i.e. 0.38 mm available off-the-shelf, with the exclusion of that intended to envelop the diodes 14. To guarantee good incorporation of the diodes into the interlayer which is softened in the course of the assembly process, the interlayer or interlayers facing the diodes must offer a thickness at least equal to the height of the diodes on their carrier. As a precaution a slightly larger interlayer thickness is used. This is the reason why two interlayers 7 and 8 are used which total a thickness of 1.14+0.76 mm, i.e. nearly 2 mm, for a height of the diodes on the carrier sheet 4, of the order of 0.8 to 1.5 mm.

During assembly the interlayer sheets subjected to stoving under vacuum, stick to one another and to the glass and PET sheets. The vacuum maintained allows air bubbles that could be trapped to be evacuated.

In the example the glass sheets 1 and 2 are respectively 1.6 mm and 2.1 mm thick. The assembled glazing exhibits a total thickness of 7.54 mm.

The sheet 1 is made of a clear glass whose optical characteristics are below 4 mm thick and an illuminant A:
TL A4 90%; TE4 86%.
The sheet 2 is made of gray glass the characteristics of which are:
TLA 4 17%; TE4 15%; $\lambda_D$ 490 nm; P 1.8
(where $\lambda_D$ is the dominant wavelength and P is the excitation purity).

The assembled glazing, comprising the infrared-reflecting layers in position 2, and several interlayer sheets of gray PVB, exhibits the following optical characteristics:
the liquid-crystal film being in the unactivated state
TL A 3.1%; TE 1.4%; $\lambda_D$ 586 nm; P 5.7; and a color rendering index (D65 EN 410) of 96.
In CIELab coordinates this coloration in transmission is characterized by:
L*20.5, a*0.7, b*1.3
In outward reflection the reflectance is established at 12.2%, and the colorimetric coordinates are
L*41.6, a*−3.0, b*−4.0
the reflection inside the vehicle is 4.3%;
the liquid-crystal film being in the activated state under 65 V and 50 Hz
TL A 6.0%; TE 3.0%; $\lambda_D$ 555 nm; P 4.0; and a color rendering index (D65 EN 410) of 93.
In CIELab coordinates the coloration in transmission is:
L*29.3, a*1.7, b*−1.9
In outward reflection the reflectance is established at 12.2%, and the colorimetric coordinates are
L*41.6, a*−3.3, b*−3.5
the reflection inside the vehicle is 4.3%.

FIG. 2 represents in a partial sectional schematic manner the glazing of FIG. 1 after assembly. The opaque black enameled band 21, which conceals, in particular from outside, the limits of the subjacent LC film, is added. In this manner the appearance of the glazing exhibits a certain uniformity with the exception of the inserted elements 4 bearing the diodes. The use of a carrier plate 4 made of glass whose refractive index is slightly different from that of the PVB interlayer into which it is inserted, is not entirely masked, but it remains hardly visible because of the very absorbent sheet 2.

Figure 4:
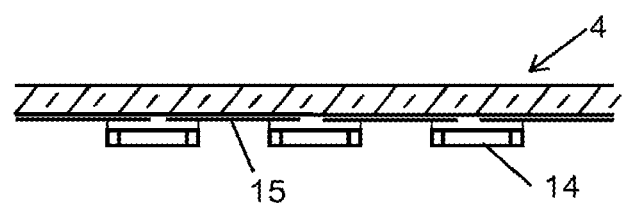
FIG. 4 is a schematic cross-sectional view of a diode carrier.

FIG. 4 illustrates in a schematic manner the disposition of the diodes 14 on the carrier consisting of the glass plate 4 clad with a conducting layer of ITO 15.

The conducting layer 15 is cut out so as to constitute the power supply circuit of the diodes 14. The diodes are glued to this layer. They are confined to a limited area in order to obtain a concentrated beam of sufficient power. The conducting circuit is constituted so as to separate the power supply poles, each diode being linked directly or not to each of the two poles. The diodes can be mounted in series or in parallel or in subsets constituting series as is represented in FIG. 5. The advantage of a series mounting is that the power supply circuits are simplified. The manifest drawback is the risk of a failure of a diode bringing about the failure of the series-mounted assembly.

A schematic circuit is for example shown in FIG. 5. The plate 4, seen from above, comprises a conducting layer that is applied to most of the plate. The layer is divided so as to constitute the power supply circuit of the diodes 14. The layer is made up of two symmetrical portions preserving a large area in order to dissipate, as much as possible, the heat produced in this layer by Joule heating. The dimensions of the surfaces of these conductors are also determined so as to guarantee a practically identical supply current for each of the diodes 14. Each part supplies 4 diodes and is itself divided into two (28 and 29) each corresponding to a power supply pole (+,−). The diodes 14 mounted in series of four, are each linked to the two poles.

To form the circuit the layer 15 initially extends uniformly over the entire surface of the glass sheet 4, some edges optionally not being coated. The various zones in this layer are separated by lines 21 scribed in this layer for example by ablation by means of a laser using well-known prior-art methods. The width of the ablation is limited to the width necessary to guarantee that the zones are electrically well insulated from one another.

The diodes are distributed in order to distribute as best as possible the heat produced during operation. The diodes are spaced apart from each other, but by a distance limited by the need to confine the resulting luminous emission. In the example the diodes are disposed in a rectangle of 6×12 cm.

By way of example, the conducting layer is a layer of indium tin oxide (ITO) with a resistance of 10Ω/□. An ITO layer is advantageous, especially because of its color neutrality. In particular it has substantially no effect on the appearance in transmission.

FIG. 5 also presents an electrode 30 comprising two elements nested one in the other and linked to conductors 25, 26. The electrode and its conductors are also made in the cut-out conducting layer like the power supply circuit of the diodes. This electrode 30 is linked to an assembly controlling the switch of the diodes in a circuit of capacity variation type. The charging time of the electrode depends on its capacitance, which itself varies depending on conductive elements placed nearby and that modify the electromagnetic field. The movement of the operator in this direction thus triggers a switch relay of the diodes. If needs be, the circuit may as known also comprise a dimmer allowing different power levels to be supplied for lighting of various intensities, each pulse causing a change from one level to another.

To limit the parasitic triggerings, the surface area of the conductors 25 and 26 for connecting the electrode 30 to the device, not represented, is as small as possible in proximity to the electrode itself. The infrared-reflecting film 11 constitutes a screen which prevents the triggering of the capacitive sensor from outside the vehicle. This screen is added to that constituted by the control electrodes of the LC film.

The glass plate 4 in the example presented comprises in addition a diode 22 whose role is to indicate the site of the control electrode. This diode is of very low power compared with that of the diodes of the reading light. It operates for example when the diodes of the reading light are not lit. The diode 22 is also powered by conductors 23, 24 cut out in the conducting layer 15.

The conditions to be met for a reading light are for example to place a given sufficient illumination on a surface and at a set distance. In one example, the distance is 0.6 m between the roof and the surface to be illuminated, which is fixed at a circle of 0.25 m radius. The minimum illumination required on this surface is for example 55 lux.

In the example in question, the diodes used are NS2W150A diodes from Nichia. It is a question of diodes of average power producing a "cold white" light. They are powered at a voltage of 30.2 V and each at a current of 25 mA.

The luminous intensity given by the manufacturer is 17.4 cd for a current of 0.150 A. In the range in question, luminous intensity may be estimated to be roughly proportional to electrical current. This luminous intensity along the normal to the diode is therefore established at about 2.9 cd. It varies according to the direction considered in the manner presented in the graph of FIG. 6. Thus, without optical means modifying the direction of the luminous flux, for an angle of 23° on either side of the normal, which corresponds approximately to the illuminated zone desired under the conditions indicated above, the luminous intensity emitted by a diode is about 10.45 cd. It is necessary to take account of the impact of the insertion of the diodes into the laminate, and in particular of the reflections and of the luminous absorption along the path of the beam. Finally, to achieve the necessary illumination, about 8 diodes of this type are required to form the reading light.

Use of a plurality of diodes of limited power, apart from controlling local heating, also decreases the dazzle that may result from direct observation of the diodes. This effect may be further minimized by promoting a certain amount of scattering of the light beam, for example by frosting the internal sheet in the location corresponding to the diodes.

The luminous flux emitted by the diodes is characterized by the color coordinates shown in the graph in FIG. 8 and represented by the limits designated by the overall reference N. The range such as offered by the manufacturer is subdivided into portions corresponding to distinct classes left to the choice of the user. The manufacturer proposes, if needs be, to select the diodes beforehand so that they are all located in just one of these portions. This selection, which allows the color to be narrowed, has an additional cost associated. The same graph shows the perimeter P corresponding to the preferred color according to the invention. It will be noted that this color, which covers to a large extent that of the diodes, also takes into account the incidence of the glass sheet that is interposed between the diodes and the cabin, and optionally that of the interlayer if the latter is colored.

In the preceding example, the diodes emit a flux of slightly bluish white light that is qualified "cold". If a "warm" light is preferred, a product of the same type may be chosen, such as the Nichia product referenced NS2L150A. The spectrum of these diodes corresponds to the perimeter designated M.

As indicated above, more powerful diodes are optionally used, but apart from an additional cost, they have the drawback of a lower longevity.

Placing the 8 diodes in the laminate does not result in destructive heating. For continuous operation in an immobile atmosphere at an ambient temperature of 25° C., the glazing being placed in a substantially horizontal position, the temperature increases to about 35° C. These temperatures degrade neither the diodes nor the components of the glazing.

Without concentrating means, the luminous flux emitted by the chosen diodes is distributed in the way shown in the graph in FIG. 4. In this graph the luminous intensity scale is on the horizontal axis. The concentric semi-circles represent fractions of intensity, from 0 to 100%, of the greatest intensity, which is located vertically. The intensity is read from the graph at the point where the straight line corresponding to the direction intersects the circle C. The luminous intensity rapidly decreases as the angle is increased relative to the normal to the source. It is no longer more than about half for an angle of 60°. This distribution may be satisfactory if, outside of the area that it is desired to illuminate, a certain luminosity is not bothersome. Assuming the opposite is true, it is recommended to restrict the light beam.

FIG. 7 analogous to FIG. 2 presents in a schematic manner the luminous flux issuing from the glazing. The luminous flux emitted by the diodes 14 is distributed as a broadly open beam. With no other device than the reflector that forms part of the packaging of the diode, the initial flux is developed over an angle at the origin, in other words in the interlayer material and in the sheet 2, which may be as large as 180° and is not ordinarily smaller than 120°, depending on the configuration of the packaging of the diode. This is represented by the angle $\alpha_1$.

When it is desired to limit the beam, additional measures are required. FIG. 7 schematically illustrates the use of a Fresnel lens 31 on the face 4 of the glazing facing the diodes. In this way, the beam angle is decreased to $\alpha_2$.

Another mode capable of producing a beam of smaller beam angle consists in using a diaphragm to limit the flux to the portion directed in the desired direction. The diaphragm may consist of an opaque enamel pattern 32 applied to the face of the glass sheet 2 facing toward the cabin. This arrangement must be applied to each diode individually. It is therefore necessary for the respective positions of the diodes and the apertures in the opaque enamel layer to be rigorously established.

The graph in FIG. 6 illustrates the effect of one example of this way of limiting the beam with a diaphragm. The diaphragm is represented by two arrows defining the aperture. The enamel 32 is placed 3 mm from the source, which is the same size as a diode i.e. about 2.5 mm in size. The enamel-free aperture is 0.5 mm. In this configuration, the beam angle is 48°.

The glazed roofs according to the invention advantageously combine several functionalities. Among the latter, it is advantageous to use the glazed roof for lighting, as explained above, but also to provide means allowing the luminous transmission to be controllably varied, whether this variation occurs simultaneously or not.

The use of LC films makes it possible to modify in a manner the transmission between two distinct states, a transparent state and a diffusing state. Without application of electric field the glazing is diffusing and ensures the "privacy" aspect sought. The variation of luminous transmission visible between the two states of the LC film also adds to this aspect but remains limited.

The structure of the glazing is also such that it confers a non-dazzle aspect upon the latter in all modes of use.

The description of the switch of the diodes can be reproduced as regards the possible switch controlling the operation of the LC film. The sensor also comprises transparent electrodes constituted in a conducting and transparent thin layer which is advantageously analogous to that described in regard to the control of the diodes. Just as for the sensor associated with the diodes, that controlling the LC film can comprise an element signaling the position of this sensor. Here again a diode of low power is advantageously used. Quite obviously the circuit constituted in the conducting layer is simpler insofar as apart from the electrodes this carrier comprises only two conductors for powering the diode in question.

In FIG. 7, the functional elements present in the laminate are in relative positions that take their possible interdependence into account. By way of indication, the illuminating means formed by the light-emitting diodes are very obviously located under the film used to control luminous transmission, so that the luminous flux that they produce is independent of the variations in luminous absorption set by this film.

The film used to control luminous transmission and the lighting means are necessarily supplied with electrical power. They are necessarily connected to the general electrical power supply of the vehicle via the edges of the glazing. The connecting electrical cables are not normally transparent. In order not to interrupt the even limited transparency of the glazing, care is taken to conceal these cables in peripheral zones of the glazing, which normally comprise opaque enamel portions especially intended to mask the marks of irregular adhesive joints.

The structure of the films of LC type is shown schematically in FIG. 3. This structure comprises a central element 12 consisting of a polymer containing particles sensitive to the application of the electric field. On either side of this central element 12, and extending over each of the faces of the latter, two electrodes 13 allow the voltage required for control to be applied. As known, the electrodes 13 advantageously consist of essentially transparent sheets coated with thin conducting layers. They most often consist of sheets of polyethylene glycol terephthalate (PET) of a few tens of microns in thickness, which combine a good transparency with a high mechanical resistance. On these sheets the conducting layers are advantageously of the TCO type, such as the ITO (indium tin oxide) layers.

The invention claimed is:

1. A laminated glazed automotive vehicle roof comprising:
   two glass sheets, external and internal; and
   interlayer sheets assembling the glass sheets; and
   further comprising, disposed between the two glass sheets, a control assembly for controlling luminous transmission of LC type (liquid-crystal film), and lighting elements based on light-emitting diodes (LEDs),
   wherein the LEDs are placed on a glass plate carrier that is distinct from the interlayer sheets and distinct from the two glass sheets,
   in a thickness where the LC control assembly and the LEDs are overlaid, the LEDs are disposed under the LC control assembly,
   a conductive oxide layer is formed directly on the glass carrier, and
   the diodes are attached directly to the glass carrier.

2. The roof according to claim 1, wherein choice of diodes of a power supply and of their disposition in the laminate is such that during continuous operation temperature in the laminate remains less than 100° C.

3. The roof according to claim 2, wherein an operating electrical power of the diodes is not greater than 2 w.

4. The roof according to claim 1, wherein luminous effectiveness of each diode is not less than 15 lm/w.

5. The roof according to claim 1, wherein the diodes and elements situated between the diodes and a cabin are chosen such that luminous flux exhibits a spectrum situated in the perimeter defined by points with coordinates CIE 1931: (0,2600;0,3450), (0,4000;0,4000) (0,4500;0,4000), (0,3150; 0,2900), (0,2350;0,2000).

6. The roof according to claim 1, wherein the two glass sheets constitute two faces, external and internal, of the roof, and at least one of the sheets is a strongly absorbent colored glass.

7. The roof according to claim 1, further comprising a system of infrared-filter-forming layers disposed between the external glass sheet and the LC control assembly.

8. The roof according to claim 7, wherein the system of infrared-filter-forming layers is applied to the external glass sheet on face 2.

9. The roof according to claim 7, wherein the system of infrared-filter-forming layers is a system produced by cathodic sputtering and includes an assembly of three layers based on silver.

10. The roof according to claim 1, wherein an interlayer sheet situated between the external glass sheet and the LC film is colored and constitutes a screen to UV.

11. The roof according to claim 1, further comprising switch controls with a sensor of capacitive type incorporated in the roof to control diodes and/or the LC film.

12. The roof according to claim 1, the assembly of whose constituents, including glass sheets, interlayer sheets, LC film, and reflecting layers, limit transmittance, measured according to the EN410 standard with integration sphere, in an activated state of the LC film at most to 30%.

13. The roof according to claim 12, wherein the transmittance is at least equal to 3%.

14. The roof according to claim 1, wherein the LC film is chosen such that in an activated state, haze measuring diffusion according to the ASTMD 1003 standard, orthogonally to a surface, is not greater than 12%.

15. The roof according to claim 1, wherein the LC film is chosen such that in an activated state, haze measuring diffusion according to the ASTMD 1003 standard, for an angle of up to 20° with respect to normal to a surface, is not greater than 20%.

16. The roof according to claim 1, wherein energy transmission measured according to the ISO 13837 standard, in an unactivated state of the LC film is less than 10%.

17. The roof according to claim 1, wherein an outward facing glass sheet is a clear or extra-clear glass sheet.

18. The roof according to claim 1, wherein constituents are chosen such that reflection inside the vehicle is less than 15%.

19. The roof according to claim 1, wherein one of the interlayer sheets has a cutout shaped to match a shape of the carrier.

20. The roof according to claim 1, wherein the glass plate has a thickness of 0.5 mm or less.

21. The roof according to claim 1, wherein the one of the interlayer sheets defines a housing which can receive the carrier.

22. A laminated glazed automotive vehicle roof comprising:
   two glass sheets, external and internal; and
   interlayer sheets assembling the glass sheets; and
   further comprising, disposed between the two glass sheets, a control assembly for controlling luminous transmission of LC type (liquid-crystal film), and lighting elements based on light-emitting diodes (LEDs),
   wherein the LEDs are placed on a glass carrier that is distinct from the interlayer sheets and distinct from the two glass sheets, and
   in a thickness where the LC control assembly and the LEDs are overlaid, the LEDs are disposed under the LC control assembly,
   a conductive oxide layer is formed directly on the glass carrier, and
   the diodes are attached directly to the glass carrier.

* * * * *